United States Patent [19]

Silvestrini et al.

[11] Patent Number: 4,760,780

[45] Date of Patent: Aug. 2, 1988

[54] APPARATUS FOR LOOSENING THE SKIN OF MOISTURE BEARING FRUIT

[75] Inventors: Jesus A. Silvestrini; Jose E. Barbier; Juan C. Morsucci, all of Mendoza, Argentina

[73] Assignee: Imdec S.R.L., Mendoza, Argentina

[21] Appl. No.: 904,878

[22] Filed: Sep. 5, 1986

[30] Foreign Application Priority Data

Sep. 6, 1985 [AR] Argentina .............................. 301530
Feb. 19, 1986 [AR] Argentina .............................. 303179

[51] Int. Cl.⁴ .................................................. A23N 7/00
[52] U.S. Cl. ......................................... 99/584; 99/472; 99/516
[58] Field of Search ............... 99/472, 483, 470, 454, 99/536, 576, 540, 584, 467, 469, 516, 537; 426/481, 482, 509

[56] References Cited

U.S. PATENT DOCUMENTS

| | | | |
|---|---|---|---|
| 2,847,334 | 8/1958 | Kilburn et al. | 99/584 X |
| 3,115,915 | 12/1963 | Steber | 99/584 X |
| 3,769,439 | 10/1973 | Kafejiev et al. | 426/482 |
| 4,026,203 | 5/1977 | Levati | 99/472 |
| 4,092,910 | 6/1978 | Genchev et al. | 99/516 X |
| 4,125,066 | 11/1978 | Stokes | 99/534 |
| 4,315,039 | 2/1982 | Levati | 426/482 |
| 4,562,772 | 1/1986 | Battistini | 99/584 X |

FOREIGN PATENT DOCUMENTS

| | | | |
|---|---|---|---|
| 2263032 | 12/1971 | Fed. Rep. of Germany | 99/584 |
| 2631410 | 7/1976 | Fed. Rep. of Germany | 99/584 |

Primary Examiner—Timothy F. Simone
Attorney, Agent, or Firm—Pettis & McDonald

[57] ABSTRACT

Apparatus is disclosed for loosening the skin of moisture bearing fruit which have been heated at a first pressure to a predetermined temperature. This includes structure for introducing fruit into the apparatus, structure for holding the fruit and moving it along a predetermined path, equipment positioned along the path for reducing the pressure surrounding the fruit sufficiently below the first pressure to cause expansion of the moisture inside the skin of the fruit to loosen that skin, and finally structure for discharging the fruit from the holding and moving equipment at generally ambient pressure.

5 Claims, 3 Drawing Sheets

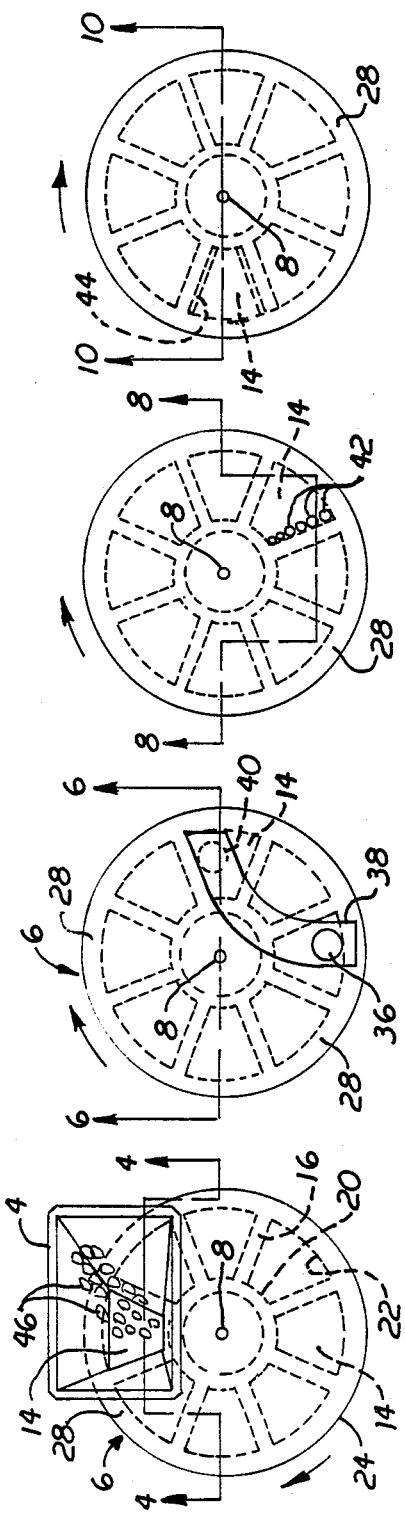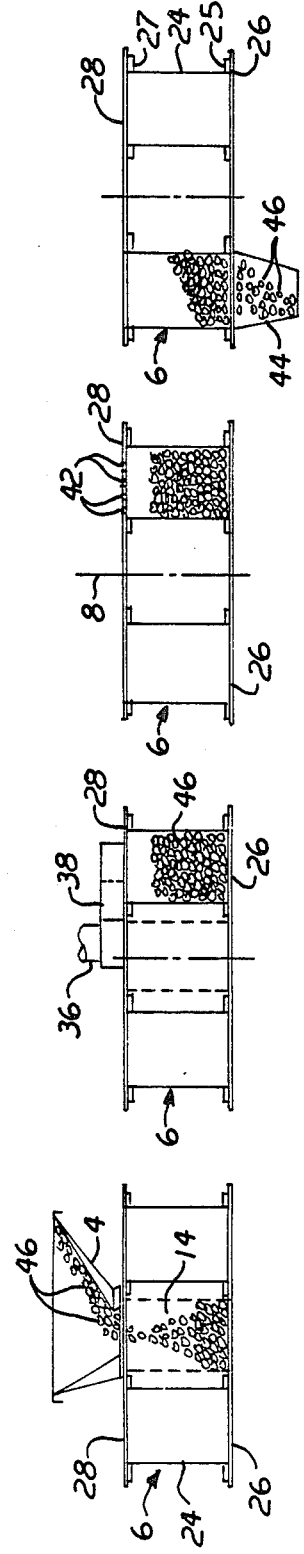

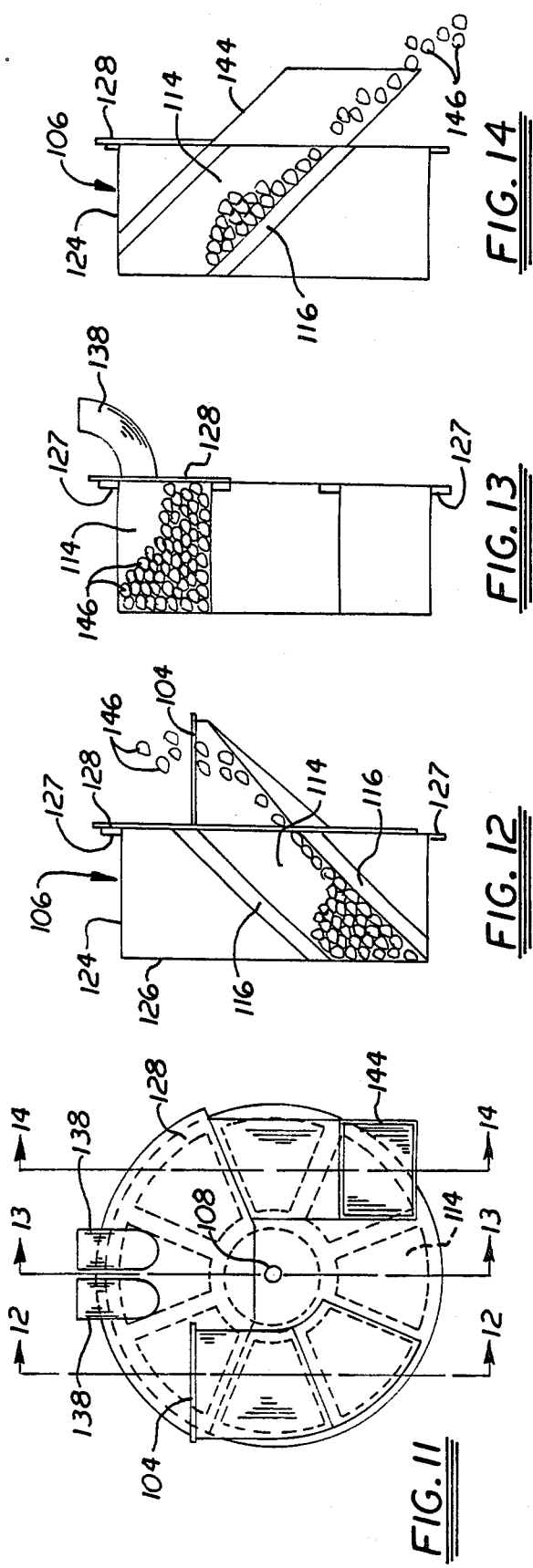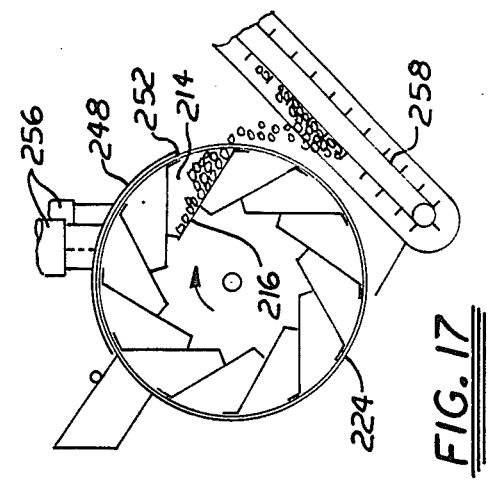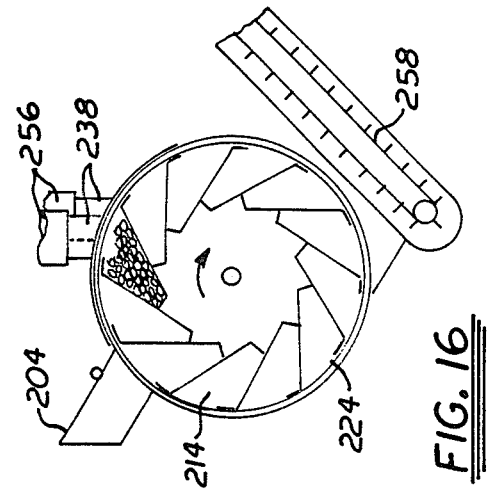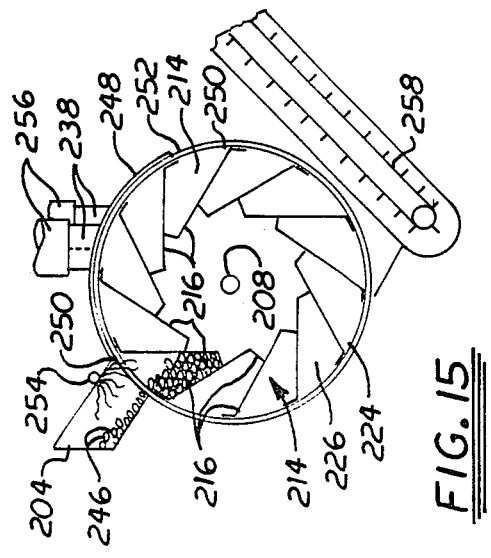

APPARATUS FOR LOOSENING THE SKIN OF MOISTURE BEARING FRUIT

FIELD OF THE INVENTION

This invention relates generally to the field of apparatus for peeling fruit. More particularly, it relates to methods and apparatus for peeling fruits, such as tomatoes, without the use of caustic chemicals and with little mechanical deformation of the fruit.

BACKGROUND OF THE INVENTION

The most common method and apparatus used in peeling fruit, particularly moisture bearing fruit having thin skins, such as tomatoes, provides for scalding the fruit and then applying caustic chemicals to remove the skin therefrom. Certain other types of apparatus, including U.S. Pat. No. 435,572 to Jesus Antonio Silvestrini have disclosed various mechanical techniques for gripping the fruit and stripping the skin or peel therefrom. However, these prior methods and apparatus have suffered from various disadvantages. The chemical type of peeling has necessitated the subsequent washing of the peeled pump to remove any remaining traces of chemicals, a process which may damage the pulp or remove otherwise edible portions thereof. Additionally, the juice resulting from the operation of these chemical type peeling devices has been unusable because of its contamination with the chemicals.

The previously known mechanical peelers from fruit of this type frequently have caused damage to the fruit and loss of usable pulp due to the mechanical gripping and squeezing arrangements. Certain of these prior art devices have also suffered from mechanical breakdown because of the complex and sometimes delicate moving parts necessary for satisfactory operation. Many types of the previously known mechanical peelers have also been suited only for peeling fruit of a predetermined size, a characteristic that requires an additional preliminary step of sorting by size and the provision of different machines for different sized fruit.

SUMMARY OF THE INVENTION

To overcome the disadvantages of the prior art, it is an object of the present invention to provide an apparatus for loosening the skin of such moisture bearing fruit, for subsequent removal of the skin, which operates in a substantially continuous manner without the use of chemical elements or mechanical elements that may damage the pulp or the juice. It is a further object of this invention to provide an apparatus that is capable of handling, without adjustment, fruit of different sizes and shapes, and which permits the recovery for subsequent packing of juice produced during the skin loosening and subsequent peeling steps performed on the fruit. It is a further object of this invention to provide for such loosening of the fruit skin by apparatus utilizing a thermophysical process that does not require physical gripping fruit of a predetermined size for satisfactory operation.

To achieve the foregoing and other objects that will become apparent to those skilled in the art, this invention provides apparatus for loosening the skin of moisture bearing fruit whose skin has been heated at a first pressure to a predetermined temperature, which apparatus includes structure for introducing such fruit into the apparatus, mechanisms located adjacent to such fruit introducing structure for holding the fruit and moving the fruit along a predetermined path, equipment positioned along such path for reducing the pressure surrounding the fruit sufficiently below the first pressure to effect expansion of the moisture borne by the fruit adjacent and inside the fruit skin, and structure for discharging the fruit from the holding and moving mechanism at generally ambient pressure. In a particularly preferred embodiment of the apparatus of this invention, previously scalded fruit, such as tomatoes, are introduced into a chamber and such chamber is subsequently evacuated to effect evaporation of the moisture immediately below the skin of the fruit, thus loosening the fruit. The chamber is then brought to ambient pressure and the fruit discharged therefrom, loosened from its skin which may then fall separately from the fruit pulp.

DESCRIPTION OF THE DRAWINGS

FIGS. 3, 5, 7 and 9 are schematic representations of the steps of operation of the apparatus of FIG. 2, illustrated in top plan view;

FIGS. 4, 6, 8 and 10 are side elevational views in section of the corresponding apparatus shown in FIGS. 3, 5, 7 and 9, respectively, taken along the respective lines 4—4, 6—6, 8—8 and 10—10;

FIG. 11 is a side elevational view of apparatus similar to that of FIG. 1 but with the cylinder mounted with a horizontal axis of rotation;

FIGS. 12, 13 and 14 are side elevational views in section taken along lines 12—12, 13—13 and 14—14 of FIG. 11; and FIGS. 15, 16 and 17 are schematic side elevational views, partially in section, of yet another embodiment of the apparatus of this invention utilizing a cylinder with a horizontal axis of rotation with generally radial introduction and discharge of the fruit being processed.

DETAILED DESCRIPTION OF PREFERRED EMBODIMENTS

Three suitable embodiments of the apparatus of this invention are illustrated, respectively, in FIGS. 1–10, FIGS. 11–14 and FIGS. 15–17. Because of the general similarity of certain portions of each of these embodiments with the corresponding portions of the other embodiments, the embodiment of FIGS. 1–10 will be described in detail below, and the other two embodiments of the apparatus will be described with reference to the schematic drawings illustrating the principal differences between these two alternative embodiments and the first.

Figure 2:
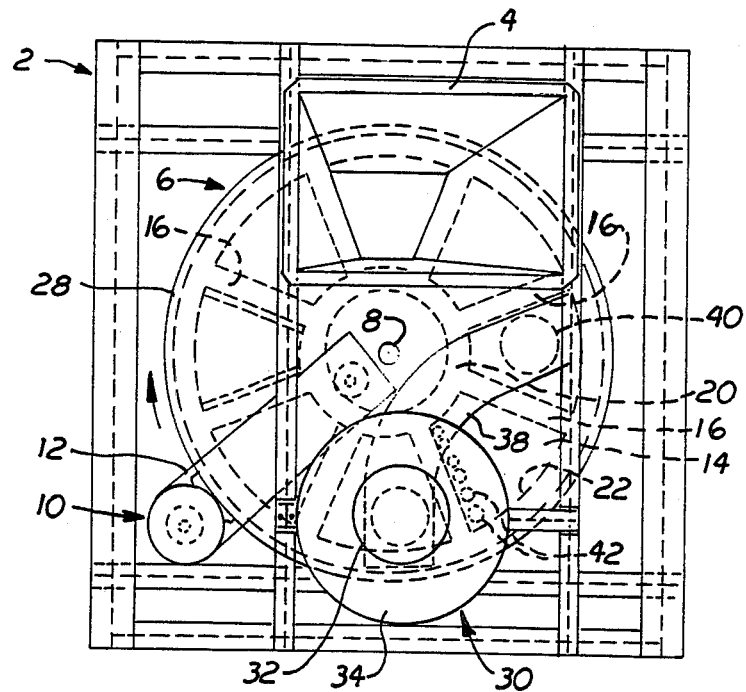
FIG. 2 is a top plan view of the apparatus of FIG. 1.
Figure 1:
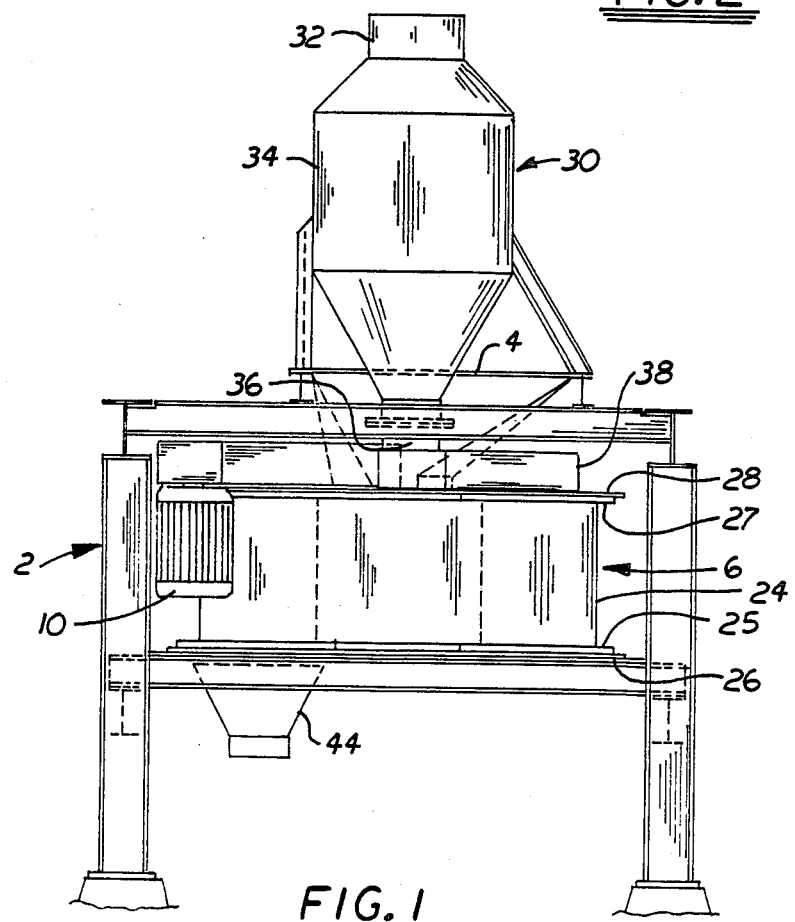
FIG. 1 is a side elevational view of one embodiment of the apparatus of this invention.

In the side and top views of FIGS. 1 and 2 is illustrated one preferred embodiment of the apparatus of this invention. This apparatus includes, generally, a support frame 2 to which are mounted means 4, such as the illustrated chute, for introducing fruit into the apparatus and means 6, such as the illustrated cylindrical structure, for holding the fruit so received and moving it along a predetermined path. In this embodiment the fruit holding and moving structure is generally cylindrical and is rotated (clockwise in the illustration of FIG. 2) about its central axis 8 under the driving influence of suitable means 10, such as an electric motor and appropriate and conventional power transmission structure 12, such as belts and pulleys, also mounted to frame 2. In this embodiment the path along which the fruit is moved is arcuate, comprising a predetermined sector of a circle.

Within the cylindrical fruit holding and moving means 6 are provided a plurality of fruit holding chambers 14, shown in phantom as the truncated sector shaped element in FIG. 2. In this embodiment, each of these chambers 14 is generally sector shaped and defined by adjacent angularly spaced partitions 16 and radially spaced inner and outer end portions 20 and 22, respectively, as shown more clearly in FIG. 3. Inner end portion 20 is generally proximal the central axis 8, as shown. Each of these chambers 14 is therefore spaced angularly from the other such chambers 14 and defines, in this embodiment, a generally truncated sector. As will become obvious, other configurations of the fruit holding and moving mean could readily be used within the scope of this invention. Such other configurations might include, without limitation, independent chambers 14 linked together by flexible connections and moving around any convenient closed path having a shape such as an oval or any other convenient arrangement. All such similar configurations should be considered full equivalents of the simpler cylindrical structure described herein.

The cylindrical structure 6 generally comprises an annular or cylindrical member 24 that includes the circumferential chamber end portions 20 and 22 and the radially extending partitions 16 and also includes the axial cover members 26 and 28. This annular member 24 is supported for rotation upon conventional bearings and rotatably driven by the electric motor 10. Slidably engaging the axially lowermost portion of the annular member 24 is bottom cover member 26 that is nonrotatably connected to the frame 2 and urged by conventional means into close engagement with the lowermost axial extremity of the annular member 24. Slidably engaging the axially uppermost portions of the annular member 24 is top cover 28, likewise nonrotatably connected to the frame 2 and urged into close engagement with the axial extremity of that annular member 24. The annular member 24, as noted above, includes the radially extending partitions 16, angularly spaced about the axis of rotation 8 and the concentric circular chamber end portions 20 and 22 to which those partitions 16 are joined, with the outer end portions 22 forming the radially outer ends of the fruit holding chambers 14. Each of these partitions 16 and the annular end portions 20 and 22 have a predetermined axial dimension measured parallel to the axis 8 and between the opposing axial extremities of the partition members and of the end portions. Preferably, there are interposed between the opposing cover members 26 and 28 and the adjacent axial extremities of the annular member 24, slidable sealing members 25 and 27. These sealing members may suitably be formed of a synthetic resin, such as polyethylene or tetrafluorethylene, that allows the axial extremities of all portions of the annular member 24, including the partitions and the end portions, to slide against the opposing cover members 26 and 28 during rotation of that annular member 24, while maintaining a relatively air tight seal between the annular member and those cover members. This provides for slidably sealing each fruit holding chamber 14 both from the external environment and from adjacent such chambers.

Positioned along the path of movement followed by the fruit holding and moving means 6 are also pressure reducing means generally indicated by reference number 30. This pressure reducing means may conveniently include conventional suction or vacuum pumping equipment 32 joined to a plenum chamber 34, which, in turn, communicates through ducting 36 and 38 with an aperture 40 through the top cover 28 of the cylindrical structure 6. Through this aperture 40 the pressure reducing means 30 communicates with the interior of whichever fruit holding chamber 14 is positioned therebelow during the rotation of the cylindrical structure, as shown in FIG. 5.

As shown in FIGS. 2 and 7, the upper cover member 28 is also provided at a position angularly spaced from the port 40 of the conduit from the suction means, a plurality of apertures extending through the upper cover member 28 and communicating with the ambient conditions surrounding the apparatus. These apertures 42 provide for venting to ambient pressure each chamber 14 as it is rotated past those apertures 42.

As shown in FIGS. 1, 2, 9 and 10 the lower cover member 26 is provided, at a point spaced angularly and still farther around the direction of rotation, means 44, such as an aperture and chute through that lower cover member, for discharging the fruit from the cylindrical holding and moving means.

With the basic components of the apparatus of the embodiment of FIGS. 1-10 having having been described, its method of operation may now be considered. During this operation the annular or cylindrical member 24 of the cylindrical structure 6 is rotated in the direction of the arrow shown on FIG. 2. This rotation may either be stepwise or, preferably, continuous, being driven by the motor 10 with the cylindrical member 24 supported on the frame 2 for rotation about its central axis 8 that is generally vertical in this embodiment. The various steps of this operation are illustrated in the schematic representations of FIGS. 3-10. FIGS. 3, 5, 7 and 9 illustrate the various steps of the operation of this apparatus when viewing the apparatus from above. FIGS. 4, 6, 8 and 10 correspondingly represent the operations of the respective FIGS. 3, 5, 7 and 9 but in side sectional view. It is also to be understood that, while the steps are illustrated sequentially with respect to one fruit holding chamber 14 in these illustrations, the process preferably operates continuously, with each such fruit holding chamber 14 going through the steps described as the cylindrical member 24 is rotated.

In FIGS. 3 and 4 is illustrated the introduction of the fruit 46 through the introducing chute 4 into one of the fruit holding chambers 14. This fruit 46 may be of various types of moisture bearing fruit, such as tomatoes, whose skin has been heated at a first pressure to a predetermined temperature, such as by scalding, before being fed down the chute 4 into the chamber 14. As is apparent, continuous rotation of the cylindrical member 24 will bring sequential chambers 14 beneath the bottom of the fruit introducing chute 4, so that fruit may be introduced into successive such chambers. The rate of dispensing of such fruit 46 into the chute 4 is controlled to provide for substantial filling of one such chamber 14 during the time that each such chamber rotates past the bottom of the chute.

Continued rotation of the cylindrical member 24 serves to move the fruit along the arcuate path described by rotation of the cylindrical structure 6 to a position shown in FIG. 5 in which the chamber 14 is positioned beneath the aperture 40 of the conduit 38 that communicates with the pressure reducing apparatus 30. By virtue of the sealing engagement between the sliding cover members 26 and 28 and the partitions 16 and end portions 20 and 22 of the cylindrical member 24 the fruit holding chamber 14 is closed from communication with the exterior or adjacent chambers 14. Thus, when the chamber 14 is brought into communication with the suction pump 32 and the plenum 34, this equipment rapidly and substantially reduces the pressure surrounding the fruit within the chamber 14. The plenum 34, by its volume, provides for a more uniform rate of pressure reduction as the chamber 14 passes below the aperture 40. This depressurization effects expansion of the air and evaporation of the water contained within the fruit tissues immediately below the skin thereof until a balance is reached between the vapor pressure under the fruit skin and the temperature of the fruit. This produces a pressure differential between points immediately below the skin and the surrounding chamber 14, thereby expanding the skin away from the pulp and loosening it from the pulp.

Continued rotation of the cylindrical member 6 moves the fruit holding chamber 14 of interest, and thus the fruit, further along this arcuate path and brings the fruit holding chamber of interest to a position beneath the apertures 42 that extend through the upper cover member 28, as shown in FIGS. 7 and 8. At this point in the movement of the fruit along the arcuate path the chamber 14 is vented through those apertures 42 to ambient pressure. Continued rotation of the cylindrical member 24 will then bring the fruit holding chamber 14 of interest to the position shown in FIGS. 9 and 10, positioned above the aperture through the lower cover member 26 and the fruit discharge chute 44. Because this chute 44 extends downwardly from the aperture through the lower cover member 26, the fruit thus falls by gravity and is thereby discharged from the apparatus. Because the skins of the fruit have previously been loosened by the expansion of water vapor under the skin, and likely ruptured thereby, those skins will easily come free of the pump of the fruit on the discharge chute 44, thereby yielding peeled fruit discharged at generally ambient pressure. The discharged fruit may be received into a container or onto a conveyor for further transport, as desired.

While the description of the embodiment of FIGS. 1-10 discloses in some detail one suitable embodiment of this invention, other embodiments, such as those illustrated in FIGS. 11-14 and FIGS. 15-17 may provide additional benefit within the scope of the invention. Both of these embodiments differ from the first primarily in having the axis of rotation of the cylindrical structure being horizontal rather than vertical. To the extent that the apparatus of these two other embodiments utilizes structures corresponding to those in the embodiment described above, there are applied corresponding reference numbers increased by 100, e.g. fruit introducing chute 104 of FIG. 11 corresponds generally to fruit introducing chute 4 of FIG. 3.

In the embodiment of FIGS. 11-14 the cylindrical member 124 is generally similar to the cylindrical member 24 of the previous embodiment, but with the partitions 116 that form the outwardly extending portions of the respective fruit holding chambers 114 being angled with respect to the central axis of rotation 108 of the member 124. This contrasts with the arrangement of the previous embodiment in which the partitions 16 extended substantially parallel to that central axis. This arrangement with respect to the second embodiment is shown most clearly in FIGS. 12 and 14.

In this embodiment of the apparatus the cylindrical structure 106 also differs in having the back cover 126, which corresponds to the bottom cover 26 of the other embodiment, rigidly affixed to the cylindrical member 124 to rotate with that member 124. This creates fruit holding chambers 114 that are closed on all sides but the one axial side facing to the right in FIGS. 12-14. The front cover member 128 functions in a manner similar to that of the top cover 28 of the previous embodiment, being fixed against rotation and slidably but sealingly engaging the right hand axial extremity of the member 124 when in the orientation illustrated in FIGS. 12-14. As with that previous embodiment sealing members 127 provide for the sealing, sliding engagement between the cover 128 and the axial extremities of the various portions of the cylindrical member 124.

The manner of operation of this second embodiment is illustrated in the schematic side sectional views of FIGS. 12-14 illustrating a particular fruit holding chamber 114 of interest as it is moved along the arcuate path described by rotation of the cylindrical member 124 about its central axis. In FIG. 11 such rotation is in the clockwise direction. In FIG. 12 the mouth of the fruit holding chamber 114 of interest is located at the nine o'clock position on FIG. 11. As the axially outer mouth of this chamber 114 rotated into communication with the fruit introducing chute 104, the fruit 146 being delivered to the apparatus may tumble down the chute 104 into the chamber 114, substantially filling it. As with the first embodiment, this fruit has been heated at a first pressure to a predetermined temperature, preferably by scalding the fruit at generally ambient pressure.

Next, as shown in FIG. 13, the fruit holding chamber of interest moves along the arcuate path with rotation of the cylindrical member 124 up to the twelve o'clock position on FIG. 11. At that position the axially outer mouth of the chamber 114 of interest is covered by the member 128 but communicates through conduits 138 to pressure reducing apparatus, such as the suction pump 32 and plenum 34 described with respect to the embodiment of FIGS. 1-10. Such pressure reducing apparatus thus withdraws the air surrounding the fruit in the chamber 114, causing vaporization of the water contained in the tissues immediately inside the skin of the fruit to loosen that skin from the pulp by expansion of that vapor. Thus, the function is analogous to the operation of the first embodiment.

In FIG. 14 the fruit holding chamber 114 of interest is illustrated as having moved further around its path of rotation to the three o'clock position on FIG. 11. In this position the axially outer mouth of the chamber 114 comes into communication and ultimately alignment with the fruit discharge chute 144. This then permits discharge of the fruit from the chamber 114. As illustrated in FIG. 14 the preferred angled configuration of the partitions 116 facilitate the discharge of the fruit from the apparatus. As can be seen from FIGS. 11-14 this angled arrangement also provides for both the fruit introducing chute 104 and the fruit discharge chute 144 to be on the same axial side of the rotatably driven cylindrical member 124.

Another and even more preferred embodiment of the apparatus of this invention is illustrated in FIGS. 15-17. In these illustrations parts functionally corresponding to those of the first embodiment are given corresponding numbers increased by 200, e.g. the fruit introducing chute is numbered as 204.

The embodiment of FIGS. 15–17 differs in structure from the preceding embodiments but functions again in a relatively similar manner. The cylindrical structure 224 is rotatably mounted in a conventional manner and driven to rotate in the direction indicated by the arrows, representing a generally clockwise rotation about central axis 208 in FIGS. 15–17. In this embodiment, the cylindrical structure 224 has a generally annular periphery with the fruit holding chambers 214 comprising chambers positioned adjacent and within that periphery, with each chamber having an opening extending through such periphery and the other sides of the chamber being closed. While the chambers 214 may have a variety of suitable configurations, in this embodiment it is preferred to form it of a plurality of partitions 216 extending generally parallel to the axis of rotation 208. The partitions 216 preferably are angled with respect to radii from the axis of rotation 208 in the manner illustrated in FIGS. 15–17 to facilitate loading of tne chambers 214 at the beginning of the processing operation and discharge of the fruit at the termination of the process, in a manner to be described below. The axially outermost sides of each of the fruit holding chambers 214 are defined by cover plates 226 and 228 (not shown) sealingly joined to the partitions 216 and moving therewith. Thus, the only opening of the chambers 214 is through the periphery of the cylindrical structure 214.

An arcuate cover member 248 is provided extending completely over the upper portion of the periphery of the cylindrical member 224, as shown in FIG. 15. This arcuate upper cover 248 is nonrotatably connected to the frame 2 (not shown) of the apparatus and slidably and sealingly engages the portion of the periphery of cylindrical member 224 therebeneath. In a manner analogous to the previous embodiment, all portions of the periphery of the member 224 are provided with slidable seals 250 which may be formed of a suitable synthetic resin to facilitate sliding but sealing engagement between the upper cover 248 and the periphery of the cylindrical member 224.

Communicating through the upper cover 248 are conduits 238 communicating at their opposite ends with pressure reducing apparatus (not shown) such as the suction pump 32 and plenum 34 of the embodiment of FIGS. 1 and 2. By virtue of the sealing engagement between the upper cover 248 and the sealing members 250 extending around the periphery of the cylindrical member 224, the open mouth of each fruit holding chamber 214 is substantially sealed from ambient conditions external to the chamber 214 when that chamber is completely engaged by the cover 248.

It should be noted that the upper cover 248 terminates with the edge thereof 252 at about the two o'clock position in FIGS. 15–17. Thus, as the chambers 214 are rotated beyond that edge 252, they are again open to ambient conditions. Thus, the positioning of this cover edge 252 and the angled arrangement of the partitions 216 provide means for discharging the fruit upon completion of the process, in a manner to be described below.

In this embodiment also is illustrated additional structure that may be incorporated into any of the three embodiments described herein. This additional structure comprises a steam injector 254 for introducing steam into the fruit holding chambers 214 before the fruit is moved along its path to the pressure reducing station. The apparatus of this embodiment also includes, as a portion of the pressure reducing means, conventional steam condensing means 256.

With the foregoing description of the schematic representation of the equipment of this embodiment the method of operation may now be seen as follows. As a fruit holding chamber 214 of interest is rotated into communication with the fruit introducing chute 204, the fruit 246 is introduced into that chamber through this chute 204. This fruit preferably has been heated at a first pressure to a predetermined temperature, such as by scalding. As the cylindrical member 224 is rotated further, the outwardly facing mouth of the fruit holding chamber 214 is moved under and into engagement with the upper cover 248, thus sealing that chamber 214 from communication with the surrounding atmosphere. As the fruit is further moved to the position illustrated in FIG. 16, the mouth of the fruit holding chamber 214 is brought into communication with the conduit 238 communicating with the pressure reducing means. Then, in a manner analogous to that described with respect to the other embodiment, the pressure reducing means extracts the air surrounding the fruit in the chamber to effect vaporization of the moisture just within the skin of the fruit, thus loosening the fruit and generally rupturing that skin. Finally, as the cylindrical member 224 continues its rotation, the mouth of the fruit holding chamber of interest 214 is moved beyond the edge 252 of the upper cover 248. This opens the fruit holding chamber 214 to ambient conditions. Additionally, the angle of the partition 216 in cooperation with the positioning of the edge 252 of the upper cover 248 thus provide means for discharging the fruit from the apparatus, suitably onto elevator 258 to carry the fruit to another location for further processing. The manner of operation is analogous to that of the other two embodiments and does not utilize the steam injectors 254 or the condensing means 256.

To improve the efficiency of the apparatus of this third embodiment, or of the two embodiments, the steam injectors 254 may be utilized. In that case, as the fruit is introduced into the holding chamber 214 steam is injected through the nozzles 254 into that chamber, thereby substantially displacing the air from that chamber as it moves into its closed sealing engagement with the upper cover 248. This injection of steam is illustrated in FIG. 15. Then, as the fruit holding chamber 214 is rotated to the position illustrated in FIG. 16, communicating with the pressure reducing means, the steam condensing apparatus 256, which is conventional, is activated to condense the steam in the chamber into water. In this manner the effort required by the suction pump (not shown) can be materially reduced, because all that is now required of it is to remove the uncondensable vapors that remain surrounding the fruit. This steam injection and condensation arrangement may be incorporated into the embodiments of FIGS. 1–10 and FIGS. 11–14 with equal facility and results.

It should also be noted that the apparatus of this invention may be utilized with equal facility in a method of operation in which the first pressure and temperature of the fruit as it is being introduced into the apparatus may be substantially ambient conditions without the fruit having previously been scalded. In this case, the fruit may be scalded during or subsequent to its introduction into the holding chambers 214 by the steam from the steam injectors 254. Thus, the first pressure under which the fruit is heated may be substantially greater than atmospheric pressure, pressurizing the fruit holding chamber 214. In this arrangement, the pressure reducing means 30, 130 and 230 may still comprise a suction pump or may simply comprise a venting arrangement to vent that superatmospheric pressure to ambient conditions. The functioning of the apparatus in this arrangement will again be exactly analogous to that described above with respect to each of the three embodiments Obviously, with each of the embodiments described above, minor modifications would be required to urge the cover members 26, 126, 28, 128 and 148 into close engagement with the cylindrical members 24, 124 and 224 to maintain that superatmospheric pressure as the fruit is carried around the path to the pressure reducing station. However, such modifications are considered to be fully within the scope of this invention.

While the foregoing has described several particularly preferred embodiments of the apparatus of this invention, numerous other variations and modifications, all within the scope of the invention, will readily occur to those skilled in the art. Accordingly, the descriptions are to be considered only as illustrative of the principles of the invention and not to be limitative thereof. The scope of this invention is to be defined solely by the claims appended thereto.

What is claimed is:

1. Apparatus for loosening the skin of moisture bearing fruit whose skin has been heated at a first pressure to a predetermined temperature, said apparatus comprising
   fruit introducing means for introducing said fruit into the apparatus;
   means located adjacent said fruit introducing means for holding said fruit and moving said fruit along a predetermined path, said fruit holding and moving means comprising a generally cylindrical structure having a generally horizontal central axis and being rotatably driven about an axis of rotation substantially coincident with said central axis and including a plurality of fruit holding chambers angularly spaced about said axis of rotation, said fruit holding chambers being defined by
   a plurality of partition members each extending generally outwardly from points generally proximal said cylindrical structure central axis;
   end portions extending between adjacent said partition members adjacent the respective innermost and outermost extremities thereof, said partition members and said end portions having predetermined axial dimensions measured parallel to said cylindrical structure axis and between the opposing axial extremities of said partition members and also between the opposing axial extremities of said end portions; and
   opposing cover means engaging said opposing axial extremities of said partition members and of said end portions to define the walls of said fruit holding chambers extending trasnverse to said partition members and said end portions, with at least one of said opposing cover means being nonrotatably mounted to the apparatus and slidably and sealingly engaging one of said axial extremities of each said partition member and said end portion;
   means positioned along said path for reducing the pressure surrounding said fruit sufficiently below said first pressure to effect expansion of moisture borne by said fruit adjacent and inside the skin thereof; and
   means for discharging said fruit from said holding and moving means at generally ambient pressure, both said fruit introducing means and said fruit discharging means being located on the same axial side of said cylindrical structure.

2. The apparatus of claim 1 wherein said fruit introducing means communicates with said fruit holding chambers through at least one of said opposing cover means.

3. The apparatus of claim 2 wherein said fruit discharging means communicates with said fruit holding chambers through at least one of said opposing cover means.

4. Apparatus for loosening the skin of moisture bearing fruit whose skin has been heated at a first pressure to a predetermined temperature, said apparatus comprising
   fruit introducing means for introducing said fruit into the apparatus;
   means located adjacent said fruit introducing means for holding said fruit and moving said fruit along a predetermined path, said fruit holding and moving means comprising a generally cylindrical structure having a central axis and being rotatably driven about said central axis and including a plurality of fruit holding chambers angularly spaced about said axis of rotation, said cylindrical structure having a generally annular periphery with said fruit holding chambers comprising chambers positioned adjacent and within said periphery with each chamber having an opening extending through said periphery, with the other sides of said chamber being closed, said fruit holding and moving means further comprising cover means nonrotatably mounted to said apparatus and slidaly engaging said cylindrical structure periphery during at least a portion of the movement of said fruit along said path between said fruit introducing means and said fruit discharge means to cover said opening of said fruit holding chamber after said fruit has been received therein, said cover means being of generally arcuate shape and sealingly engaging said cylindrical structure periphery to maintain a pressure differential established between the interior of said fruit holding chambers and ambient conditions external to said chambers;
   means positioned along said path for reducing the pressure surrounding said fruit sufficiently below said first pressure to effect expansion of moisture borne by said fruit adjacent and inside the skin thereof; and
   means for discharging said fruit from said holding and moving means at generally ambient pressure.

5. The apparatus of claim 4 wherein said arcuate cover means includes means for communication between said fruit holding chambers and said pressure reducing means.

* * * * *